(12) United States Patent
Bass et al.

(10) Patent No.: US 9,878,378 B2
(45) Date of Patent: Jan. 30, 2018

(54) KEY CLAMP ROTATION CONTROLLER

(71) Applicant: Hy-Ko Products Company, Inc., Northfield, OH (US)

(72) Inventors: Michael A. Bass, Chagrin Falls, OH (US); Richard W. Ryai, Sr., North Royalton, OH (US)

(73) Assignee: HY-KO PRODUCTS COMPANY, Northfield, OH (US)

( * ) Notice: Subject to any disclaimer, the term of this patent is extended or adjusted under 35 U.S.C. 154(b) by 686 days.

(21) Appl. No.: 14/312,277

(22) Filed: Jun. 23, 2014

(65) Prior Publication Data

US 2014/0300041 A1    Oct. 9, 2014

Related U.S. Application Data

(63) Continuation of application No. 13/361,347, filed on Jan. 30, 2012, now Pat. No. 8,770,564.

(60) Provisional application No. 61/437,197, filed on Jan. 28, 2011.

(51) Int. Cl.
*B23Q 3/02* (2006.01)
*B23C 3/35* (2006.01)
*B23Q 3/06* (2006.01)
*B25B 1/22* (2006.01)

(52) U.S. Cl.
CPC .............. *B23C 3/355* (2013.01); *B23Q 3/061* (2013.01); *B25B 1/22* (2013.01); *Y10T 409/300952* (2015.01)

(58) Field of Classification Search
CPC .... B25B 1/00; B25B 3/00; B25B 5/00; B25B 7/00
See application file for complete search history.

(56) References Cited

U.S. PATENT DOCUMENTS

| | | | |
|---|---|---|---|
| 1,750,218 A | 4/1930 | Falk | |
| 3,169,262 A | 2/1965 | Allen et al. | |
| 4,613,120 A | 9/1986 | Kozar | |
| 5,538,374 A | 7/1996 | Cole et al. | |
| 5,661,565 A | 8/1997 | Bornhorst, Jr. et al. | |
| 5,676,504 A | 10/1997 | Mueller et al. | |
| 5,794,925 A * | 8/1998 | Fantl | B25B 5/06 269/237 |
| 5,906,365 A * | 5/1999 | Wu | B23C 3/355 269/319 |
| 6,033,164 A * | 3/2000 | Hoffman | B23C 3/35 409/81 |
| 6,152,662 A | 11/2000 | Titus et al. | |
| 8,215,625 B2 * | 7/2012 | Wu | E05B 19/00 269/287 |
| 8,585,029 B2 | 11/2013 | Ryai, Sr. | |
| 8,770,564 B2 | 7/2014 | Bass et al. | |

(Continued)

OTHER PUBLICATIONS

International Preliminary Report for International Patent Application No. PCT/US2012/023123, dated Aug. 8, 2013.

(Continued)

*Primary Examiner* — Lee D Wilson
(74) *Attorney, Agent, or Firm* — McDonald Hopkins LLC

(57) ABSTRACT

A key clamping device includes a first key clamp, a second key clamp and a rotational device connected to the first and second key clamps. The rotational device may facilitate rotation of the first and second key clamps.

10 Claims, 3 Drawing Sheets

(56) References Cited

U.S. PATENT DOCUMENTS

2011/0215511 A1* 9/2011 Grob ................ B23Q 1/0009
269/134
2012/0213603 A1* 8/2012 Bass ........................ B25B 1/22
409/81

OTHER PUBLICATIONS

International Search Report and Written Opinion for International Patent Application No. PCT/US2012/023123, dated May 30, 2012.

* cited by examiner

KEY CLAMP ROTATION CONTROLLER

CROSS-REFERENCE TO RELATED APPLICATION

This application is a continuation of U.S. patent application Ser. No. 13/361,347, now U.S. Pat. No. 8,770,564, filed on Jan. 30, 2012 and entitled "KEY CLAMP ROTATION CONTROLLER," which claims priority to U.S. Provisional Patent Application No. 61/437,197 entitled "KEY CLAMP ROTATION CONTROLLER," filed on Jan. 28, 2011 each of which are hereby incorporated in their entirety by reference.

BACKGROUND

Key cutting machines are known to generally include a clamp in which a key blank is inserted and clamped for subsequent cutting by a milling operation. Conventional key cutting machines often include two such clamps: one for holding an original key already having the desired mechanical code cut therein, and one for holding a key blank to be cut. More recent key cutting machines include only one clamp for holding the key blank, as all of the cutting information may be stored electronically.

Keys come in many different styles, such as house keys and car keys, sidewinder keys, tubular keys, and other various types and styles of keys. Depending on its size and shape, each style of key may require a different clamping mechanism to properly hold the key blank in place while the key cutting machine cuts the appropriate bitting pattern into the key blank. Furthermore, depending on the design of the key cutting machine, different keys may require different clamping orientations, such as parallel or perpendicular to the cutting machine, in order to properly engage the cutting tool during the key cutting process.

Many conventional keys, such as house keys and car keys, are traditionally flat, and include a blade portion and a base portion. Such conventional keys come in various lengths and widths, and have any number of different grooves along the blade of the key. To properly hold a standard key in place while it is being cut, the blocks that engage and clamp the key must align with the key's length, width and groove configuration. Thus, for a key cutting machine to be capable of cutting various types of keys, it must have multiple clamping surfaces for properly clamping each type of key.

Several key clamps have been designed to provide clamping for various types and styles of keys. For example, key clamps have been designed with multiple clamping sides, each side capable of clamping a different key geometries. The clamp is then rotatable to orient the clamping side with the desired geometry facing the key cutting machine. However, key cutting machines with two or more key clamps of this design require that the clamps are rotated such that matching sides are oriented toward the key cutting machine to ensure that a clamped key blank matches the key style of the master key that is being cut.

SUMMARY

A key clamping device is generally presented. The key clamping device includes a first key clamp, a second key clamp and a rotational device connected to the first and second key clamps. The rotational device may facilitate rotation of the first and second key clamps.

In an embodiment, the key clamping device may include a belt to interconnect the rotational device, first key clamp and second key clamp. The belt may engage a gear connected to the first key clamp, a gear connected to the second key clamp, and a gear connected to the rotational device to translate rotation of the rotational device to the two key clamps.

DESCRIPTION OF THE DRAWINGS

Objects and advantages together with the operation of the invention may be better understood by reference to the following detailed description taken in connection with the following illustrations, wherein.

DETAILED DESCRIPTION

While the invention is described with reference to key cutting machines, it will be appreciated that the invention should not be limited to such uses or embodiments. The description herein is merely illustrative of embodiments of the invention and in no way should limit the scope of the invention.

Figure 1:
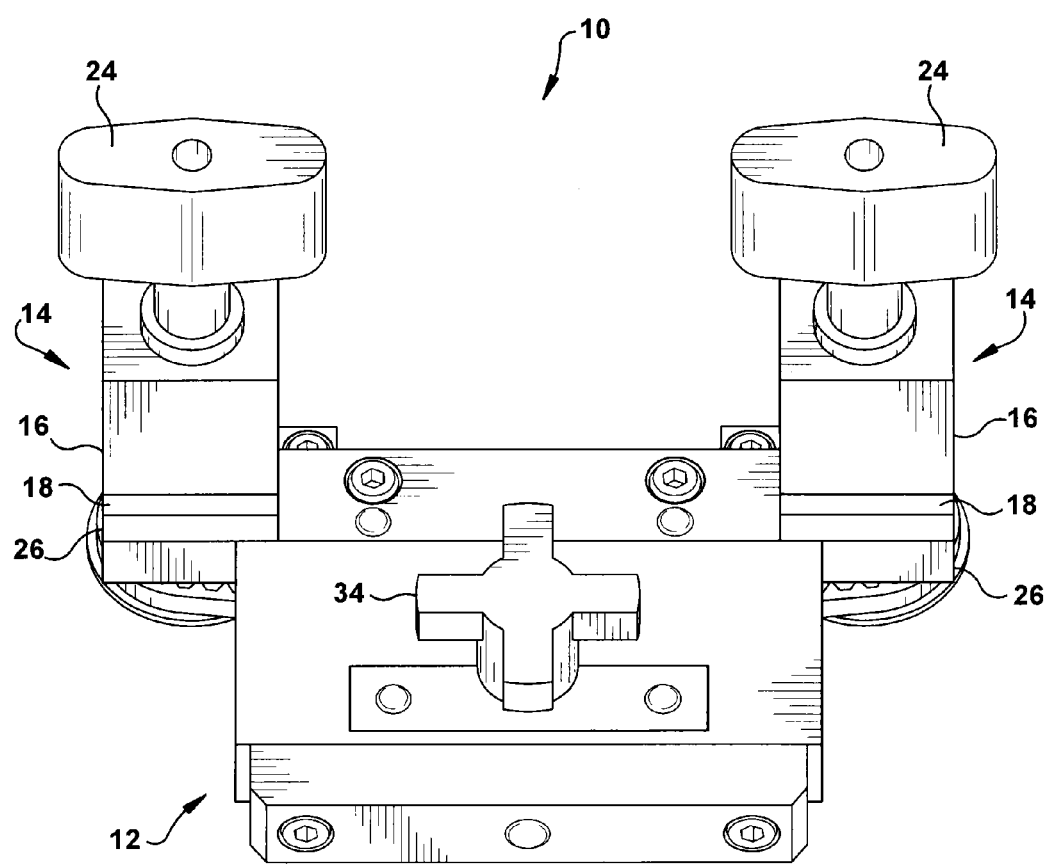
FIG. 1 is a top perspective view of a key clamping mechanism.
Figure 2:
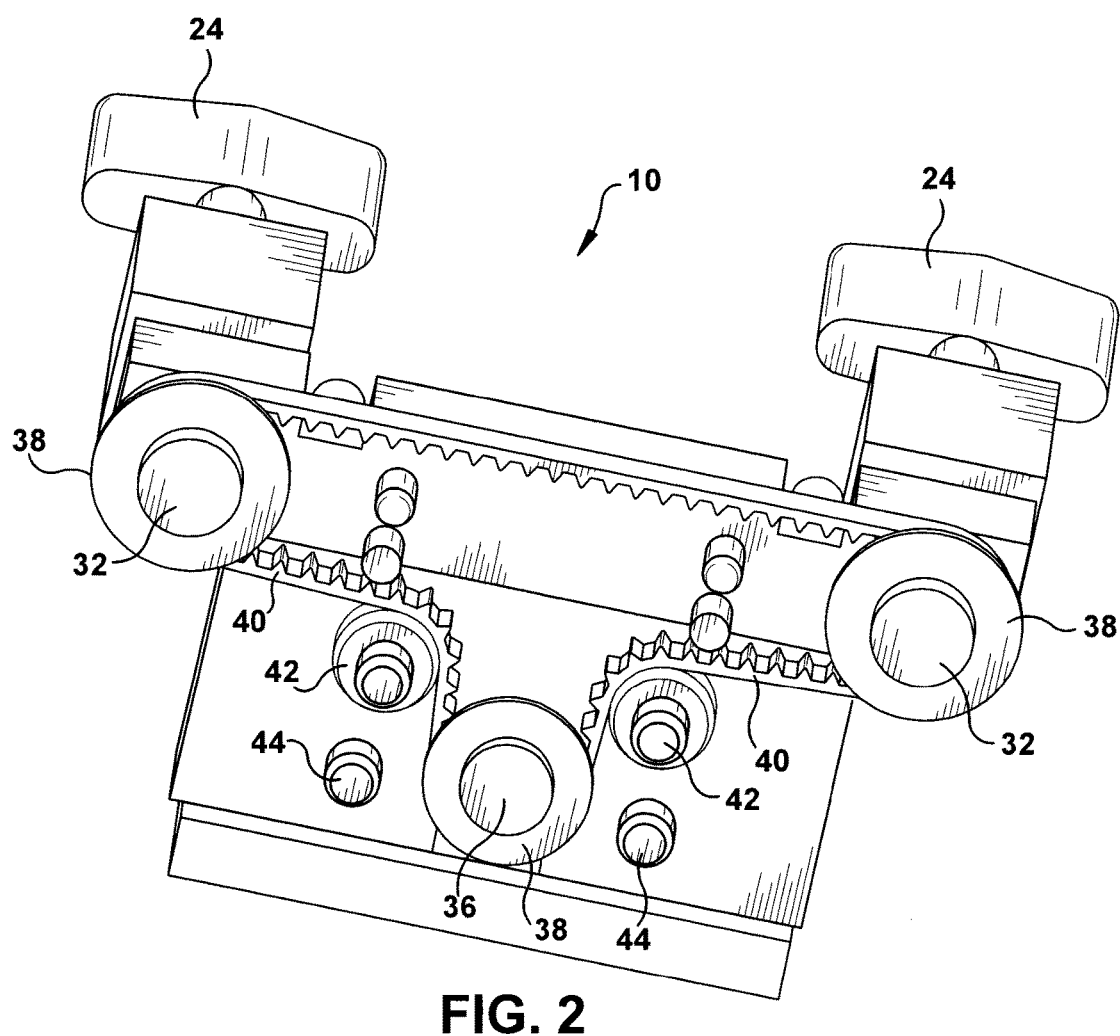
FIG. 2 is a bottom perspective view of a key clamping mechanism.
Figure 3:
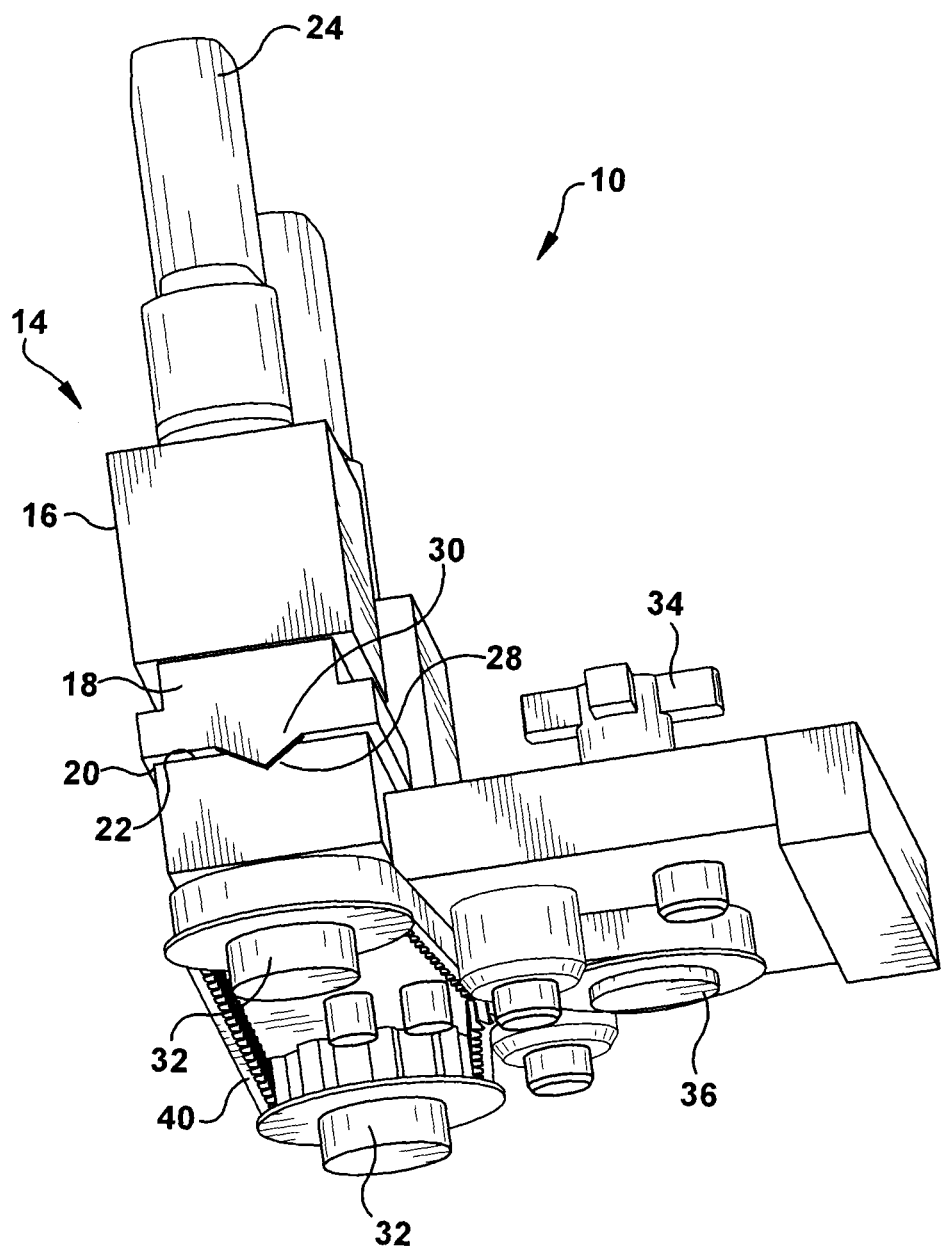
FIG. 3 is a side perspective view of a key clamping mechanism.

With reference to FIGS. 1-3, a key clamping device 10 is provided. The key clamping device 10 may be capable of clamping various types and configurations of keys. A given key cutting machine may include one, two, or any number of key clamping devices 10, depending on the design of the machine. A clamping device 10 may be used to hold a key, such as a master key having a bitting pattern cut into the blade or a key blank having an uncut blade.

The key clamping device 10 may include a carriage 12 to support one or more key clamps 14. The carriage 12 may be any appropriate size and shape, such as generally rectangular, and may connect to a key cutting machine to move with respect thereto.

As shown in FIGS. 1-3, the key clamping device 10 may include two key clamps 14. The key clamps 14 may be located at any appropriate position on the key clamping device 10, such as connected to the carriage 12. The carriage 12 may be moveable to move the key clamps 14 between multiple positions. For example, the carriage 12 may be moveable between a first position wherein the key clamps 14 are a distance away from components of the key cutting machine such as a key cutter, and a second position where the key clamps 14 are proximate to the components of the key cutting machine.

The key clamps 14 may be configured to clamp various styles of keys. For example, the key clamps 14 may include a clamp block 16 and a base block 18. The clamp block 16 and base block 18 may be any appropriate size and shape and may be located at any appropriate position. For example, the clamp block 16 may be positioned above the base block 18 such that the bottom surface 20 of the clamp block 16 engages the top surface 22 of the base block 18. The bottom surface 20 and top surface 22 may be configured to engage a key therebetween. For example, the bottom surface 20 and top surface 22 may comprise a geometry configured to engage portions of a key, such as the key blade. The bottom surface 20 and top surface 22 may be configured to engage a standard blade, a narrow blade, a wide blade, an X blade, or any other type of key blade known in the art.

The key clamps 14 may include any appropriate number of sides. For example, as shown in FIGS. 1-3, the key clamps 14 may include four sides. It will be appreciated, however, that the key clamps 14 may each include three, four, five, six or any number of sides. Each side of the key clamp 14 may comprise a different engagement between the bottom surface 20 and top surface 22. For example, a first side of the key clamp 14 may be configured to engage a standard blade, a second may be configured to engage a narrow blade, a third side may be configured to engage a wide blade, and a fourth side may be configured to engage an X blade.

The key clamps 14 may be loosened to allow a key to be placed in the clamp and may be tightened to clamp the key into place. To that end, the key clamps 14 may include a knob 24 to facilitate tightening and loosening of the key clamps 14. The knob 24 may be any appropriate size or shape and may be located at any appropriate position on the key clamps, such as on top of the clamp block 16. In an embodiment, the knob 24 may engage a screw (not shown) that extends through the key clamp 14. Rotation of the knob 24 may turn the screw to loosen or tighten the key clamp 14.

The key clamps 14 may include a support block 26. The support block 26 may be any appropriate size and shape and may be located at any appropriate position, such as beneath the base block 18 to support the key clamp 14. The support block 26 may include one or more detents 28 to receive one or more protrusions 30 in the base block 18. The detents 28 and protrusions 30 may be any appropriate size and shape and may be located at any appropriate position on the key clamps 14. For example, the detents 28 may be v-shaped to receive a similarly v-shaped protrusion 30. It will be appreciated, however, that the detents 28 and protrusions 30 may be any size or shape.

The key clamps 14 may include any number of detents 28 and protrusions 30 on each of its sides, such as one detent 28 and one protrusion 30 each centrally located on each side. The detent 28 and protrusion 30 may be aligned to allow the protrusion 30 to be nested within the detent 28. Further, the detents 28 and protrusions 30 on each side of the key clamps 14 may be sized, shaped and positioned to allow the protrusions 30 on a first side of the clamp block 16 to engage detents 28 on all other sides of the base block 18.

The key clamps 14 may be rotatable with respect to the carriage 12. For example, the key clamps 14 may include a spring (not shown) or other similar biasing device positioned within the key clamp 14. The spring may allow the base block 18 and clamp block 16 to be lifted away from the support block 26 such that the protrusions 30 are disengaged from the detents 28. Once the protrusions 30 are clear of the detents 28 the key clamps 14 may be rotated to position the desired side at the clamping location.

The key clamps 14 may include a rotation shaft 32. The rotation shaft 32 may be an appropriate size and shape and may be located at any appropriate position, such as centrally positioned within the key clamp 14. The rotation shaft 32 may extend through the support block 26 to the underside of the key clamping device 10. The rotation shaft 32 may engage a portion of the clamp block 16 and base block 18 such that rotation of the shaft 32 rotates the clamp and base block 16, 18 and vice versa.

It may be advantageous to tie rotation of a first key clamp 14 to rotation of a second key clamp 14. For example, tying rotation of the first key clamp 14 to maintain alignment with the second clamp 14 such that each clamp 14 maintains a similarly configured side in the clamping position at all times. Tying rotation of the key clamps 14 may further allow both the first and second key clamps 14 to be rotated from a single rotation point.

The key clamping device 10 may include a control dial 34. The control dial 34 may be located at any appropriate position, such as centrally located on the carriage 12 between the key clamps 14. The control dial 34 may include a control shaft 36. The control shaft 36 may be any appropriate size and shape and may extend through the carriage 12 to the underside of the clamping device 10. The control shaft 36 may be connected to the control dial 34 such that it rotates therewith.

The key clamping device 10 may include one or more gears 38. The gears 38 may be any size and shape, such as circular, and may be positioned at any appropriate location. For example, the clamping device 10 may include one or more gears 38 positioned about a portion of each rotation shaft 32 and about a portion of the control shaft 36 to rotate therewith.

The clamping device 10 may include a belt 40 or similar device to interconnect the control shaft 36 and one or more rotation shafts 32. The belt 40 may be any appropriate size and shape and may include any number of teeth 42. The teeth 40 may be sized and shaped to engage similarly shaped openings in the gears 38.

The belt 40 may be arranged to interconnect the gears 38 as illustrated in FIG. 2. The clamping device 10 may include one or more bearings 44 to constrain the path of the belt 40. The bearings 44 may be any appropriate size and shape, such as cylindrical. The bearings 44 may engage a flat back surface of the belt 40 and rotate therewith. While the clamping device 10 is described herein as utilizing a belt and gear system to interconnect the rotation shafts 32 and control shaft 36, it will be appreciated that any means known in the art may be used to accomplish such interconnection.

In an embodiment, components of the clamping device 10 may be powered or controlled automatically. For example, the control shaft 36 may be powered by a motor, such as a stepper motor, solenoid, air cylinder or other automated device (not shown). The automated device may rotate the control shaft 36 to the desired position. The clamping device 10 may include sensors to provide feedback of the control shaft's position.

In an embodiment, the key clamping device 10 may be configured to automatically select a clamping surface based on a specified input. For example, the control shaft 36 may be powered by a motor that is connected to a motor controller or microcontroller. The microcontroller may further be configured to receive inputs, such as inputs related to a selected key to be copied. For example, the microcontroller may receive information related to a scan or digital image of a selected key. The microcontroller may then direct the motor to rotate appropriately to select the corresponding sides the key clamps 14 that correspond to the key blank of the selected key. It will be appreciated, however, that such automated use is simply one embodiment and that manual use of the device may be appropriate as well.

In use, the control dial 34 may be turned to control rotation of the key clamps 14. The knobs 24 may be unscrewed to loosened the key clamps 14 prior to turning the control dial 34 in order to ease rotation. However, the dial 34 may be rotated without first loosening the knobs 24. Rotation of the dial 34 may cause a gear 38 connected to the control shaft 36 to rotate. The control gear 38 may facilitation rotation of the belt/gear system to cause rotation of the key clamps 14. A user may rotate the control dial 34 until the desired face of the key clamps 14 is located at the clamping position.

The invention has been described above and modifications and alternations will occur to others upon a reading and understanding of this specification. The claims as follows are intended to include all modifications and alterations insofar as they come within the scope of the claims or the equivalent thereof.

Having thus described the invention, we claim:

1. A key cutting machine comprising:
   a carriage;
   a first key clamp connected to the carriage;
   a second key clamp connected to the carriage;
   a rotational device connected to the carriage and interconnecting the first key clamp and second key clamp;
   wherein, rotation of the rotational device causes rotation of the first key clamp and second key clamp.

2. The key cutting machine of claim 1, wherein the first key clamp and second key clamp are each rotatable with respect to the carriage.

3. The key cutting machine of claim 1, wherein the rotational device comprises a control shaft and a dial connected to the rotational shaft.

4. The key cutting machine of claim 3 further comprising:
   a first gear connected to the control shaft;
   a second gear connected to the first key clamp;
   a third gear connected to the second key clamp; and
   a belt interconnecting the first gear, second gear, and third gear.

5. The key cutting machine of claim 4 further comprising at least one bearing arranged to constrain the belt.

6. The key cutting machine of claim 1 wherein the first key clamp and the second key clamp each have four sides.

7. The key cutting machine of claim 1 wherein the first key clamp and the second key clamp each comprise a clamping block and a base block.

8. The key cutting machine of claim 7, wherein the first key clamp and the second key clamp each further comprise a support block arranged to support the base block.

9. The key cutting machine of claim 8, wherein the base block includes a protrusion and the support block includes a detent configured to receive the protrusion.

10. The key cutting machine of claim 1, wherein the first key clamp and the second key clamp each include a rotational knob arranged to tighten the first key clamp and the second key clamp.

\* \* \* \* \*